United States Patent [19]

Pauwels

[11] 3,967,636
[45] July 6, 1976

[54] VALVE FOR FORCE-REVERSING MODULATOR

[75] Inventor: Edward M. Pauwels, South Bend, Ind.

[73] Assignee: The Bendix Corporation, South Bend, Ind.

[22] Filed: July 24, 1974

[21] Appl. No.: 491,600

Related U.S. Application Data

[62] Division of Ser. No. 415,264, Nov. 12, 1973, Pat. No. 3,840,279.

[52] U.S. Cl. ................................. 137/106; 91/47; 91/420; 137/DIG. 8; 303/21 F
[51] Int. Cl.² ..................................... F15B 13/044
[58] Field of Search.......................... 91/47, 52, 420; 137/DIG. 8, 103, 106, 612.1; 251/29, 31, 33; 303/21 F

[56] References Cited
UNITED STATES PATENTS 3,789,735  2/1974  Tam et al............................. 91/47 X
3,790,224  2/1974  Ritsema.............................. 303/21 F Primary Examiner—Alan Cohan
Assistant Examiner—Gerald A. Michalsky
Attorney, Agent, or Firm—Ken C. Decker; William N. /

[57] ABSTRACT

A control valve for use with a force-reversing modulator in a vehicle adaptive braking system is disclosed. The valve includes a housing divided into a first section connected to one side of the modulator, a second connected to engine manifold vacuum, and a third section connected to the other side of the modulator. A solenoid valve controls communication between the first section and air at atmospheric pressure. Upon actuation of the solenoid valve, the first section is communicated to air at atmospheric pressure to thereby communicate the one side of the modulator to atmospheric air. The high pressure air in the first section acts against a piston reciprocal within the housing to open another valve connecting the third section with the second section, to thereby communicate the other side of the modulator with engine manifold vacuum. Upon deenergization of the solenoid valve, a flow-restricting orifice communicates the first and second chambers to thereby communicate the one side of the modulator with engine manifold vacuum, and the other side of the modulator is connected with atmospheric air through a bleed orifice communicating the third section with the atmosphere.

5 Claims, 1 Drawing Figure

U.S. Patent July 6, 1976 3,967,636
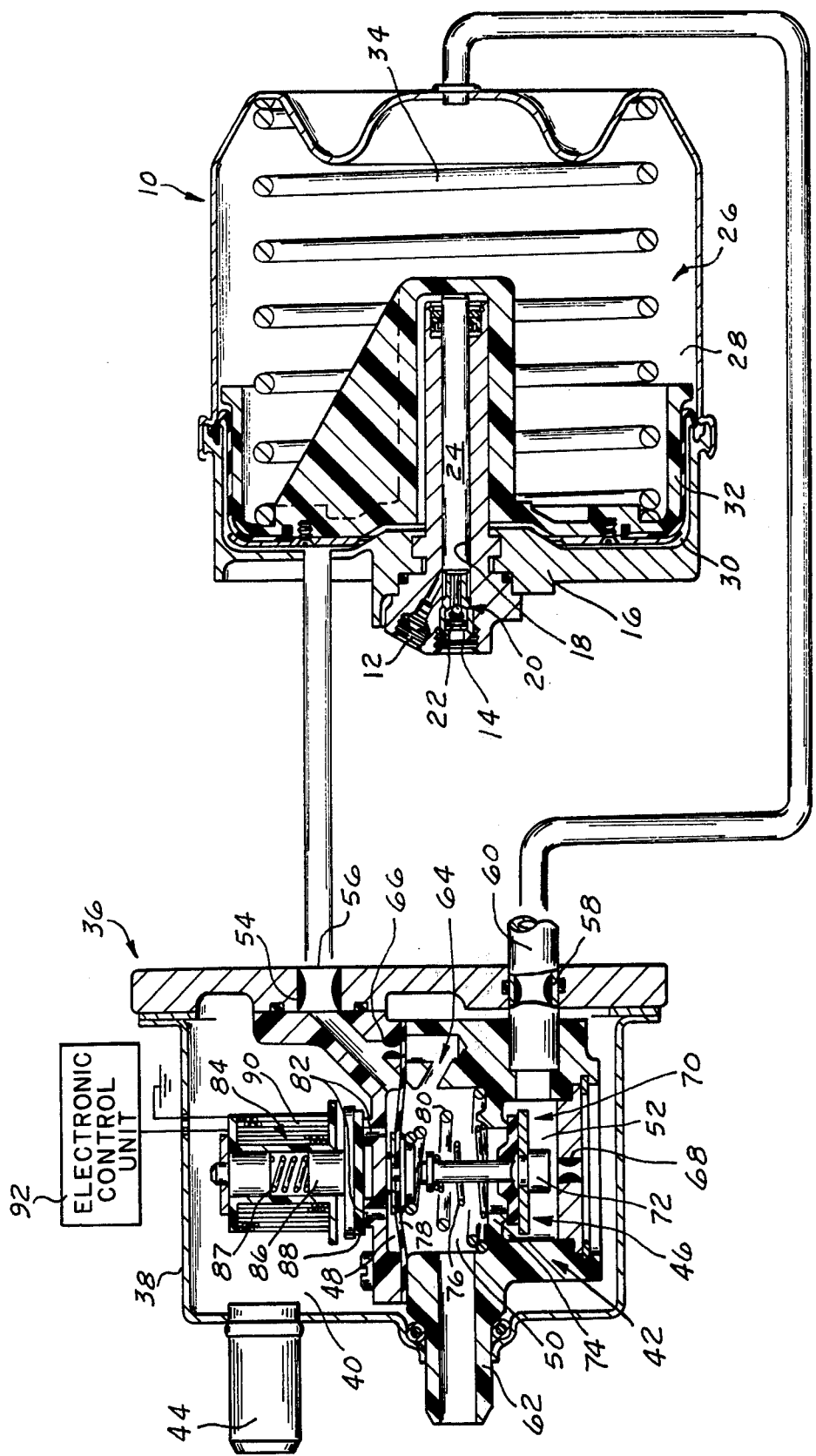

VALVE FOR FORCE-REVERSING MODULATOR

This is a division of application Ser. No. 415,264, filed Nov. 12, 1973, now U.S. Pat. No. 3,840,279.

BACKGROUND OF THE INVENTION

This invention relates to a control valve for a modulator used in a vehicle for an adaptive braking system.

Adaptive braking systems require a modulator which is responsive to control signals generally generated by an electronic control unit upon sensing an incipient skidding condition of the vehicle. The modulator is responsive to output signals from the electronic control units to decay braking pressure when the incipient skidding condition is sensed and to terminate the brake pressure decay and initiate a brake pressure build when the incipient skidding condition no longer exists. Most existing adaptive braking modulators are operated by a fluid motor including a differential pressure responsive piston. Both sides of the piston in existing modulators are normally communicated with engine manifold vacuum when an incipient skidding condition does not exist, but upon generation of the control signal from the electronic control unit indicating existence of an incipient skidding condition, one side of the pressure differential responsive piston is communicated to atmospheric air, thereby urging the latter in a direction releasing the brake pressure of the vehicle's brakes. While this type of modulator works quite well, the rather limited vacuum available in existing automobile engines limits the force which can be generated by the pressure differential responsive piston. Since, particularly in larger vehicles, these modulators cannot generate sufficient brake pressure decay rates, it is necessary to significantly increase the capacity of the modulator.

SUMMARY OF THE INVENTION

Therefore, an important object of my invention is to provide a control valve for an adaptive braking modulator, which, upon actuation of the valve by electronic control unit, switches from a first state communicating one side of the modulator with engine manifold vacuum and the other side with atmospheric air to a second state which reverses this communication.

Another important object of my invention is to provide force-reversing modulator which is capable of faster build and decay rates than existing modulators.

Another important object of my invention is to provide a simplified valve control for a force-reversing modulator which may be more easily manufactured than existing control valves.

DESCRIPTION OF THE DRAWINGS

The sole FIGURE of the drawings is a partial schematic view of a portion of a vehicle adaptive braking system, with the control valve and modulator made pursuant to the teachings of my present invention illustrated in cross section.

DETAILED DESCRIPTION

Referring now to the drawings, a vehicle adaptive braking modulator generally indicated by the numeral 10 includes an outlet port 12 communicated with the brakes of the vehicle and inlet port 14 which is communicated to a suitable brake pressure generating source, each as the master cylinder of the vehicle. The modulator 10 includes a housing 16 which defines a bore 18 therewithin which communicates the inlet port 14 with the outlet port 12. A check valve 20 is disposed within the bore 18, and a spring 22 normally urges the check valve 20 to a condition terminating communication between the ports 12 and 14. However, a plunger 24 is slidably mounted within the bore 18 and is normally disposed in a position holding the check valve 20 open, so that fluid communication is normally permitted between the inlet port 14 and the outlet port 12. Housing 16 further defines a pneumatic chamber 26 therewithin, which is divided into a first section 28 and a second section 30 by a piston 32. A heavy spring 34 yieldably urges the piston 32 to the left viewing the FIGURE, and since the right hand end of the plunger 24 abuts the piston 32, the plunger 24 will therefore also be urged to the left viewing the FIGURE, to hold the check valve 20 in the open condition.

Operation of the modulator 10 is controlled by a control valve generally indicated by the numeral 36. Control valve 36 includes an outer housing 38 dividing a cavity 40 therewithin in which an inner housing 42 is mounted. The cavity 40 is communicated to the atmosphere through a filter 44. The housing 42 defines a chamber 46 therewithin which is divided into a first section 48, a second section 50, and a third section 52. The first section 48 is communicated through a restriction 54 and an outlet port 56 to the section 30 of the modulator 10. The section 52 is communicated through a restriction 58 and outlet port 60 to the other section 28 of the modulator 10. The second section 50 is communicated to an input port 62, which is communicated with the manifold vacuum of the engine of the vehicle (not shown). A passage 64 communicates the sections 48 and 50, and includes a flow-restricting orifice 66 which permits the fluid communication between the sections 48 and 50 at a limited rate. Another flow-restricting orifice 68 communicates the section 52 with the cavity 40 and therefore with air at atmospheric pressure, also at a limited rate. Communication between the sections 50 and 52 is controlled by a valve generally indicated by the numeral 70. The valve 70 includes a valve member 72, and spring 76, which urges the member 72 into sealing engagement with an annular valve seating area 74 defined on the partition dividing the second section 50 from the third section 52. A flexible diaphragm 78 divides the first section 48 from the second section 50, and is urged upwardly viewing the drawing by another spring 80. As illustrated in the drawing, the valve member 72 and diaphragm 78 are in alignment with one another, so that movement of the diaphragm in excess of the predetermined amount will also operate the valve member 72. Passages 82 are provided to communicate the section 48 with the cavity 40 and therefore to air at atmospheric pressure. However, a normally closed solenoid valve 84 is provided which controls communication through the passages 82. The solenoid valve 84 includes an armature 86 which mounts a valve element 88 which is yieldably urged to a position closing the passages 82 by a spring 87. Valve 84 includes a solenoid 90 which, upon actuation of the latter from an output signal generated by an electronic control unit 92, urges the valve element 88 away from the passages 82, thereby permitting substantially unrestricted fluid communication between the cavity 40 and the section 48. It should be noted that the flow rate through the passages 82 is much greater than that permitted by restriction 66, so that as long as the passages 82 are open, the section 48 is maintained at substantially atmospheric pressure. The electronic control unit 92 may be of any conventional type well known to those skilled in the art, such as the unit shown in U.S. Pat. No. 3,610,703 which is owned by the assignee of the present invention and incorporated herein by reference. The control unit 92 is responsive to signals generated proportional to wheel speed to sense an incipient skidding condition of the control wheel and to actuate the solenoid 90 in response thereto. When the incipient skidding condition is terminated, the output control signal is also terminated, thereby deenergizing the solenoid 90 and permitting the armature 86 and valve member 88 to return to the position illustrated in the drawing.

MODE OF OPERATION

The various components of the modulator 10 and control valve 36 are illustrated in the drawings in the position which they assume during normal functioning of the vehicle braking system without intervention of the adaptive braking system. Due to the passage 64 and orifice 66, the pressure level in the section 48 is substantially the same as that in the section 50, and therefore, the pressure level in the section 30 of the pneumatic chamber 26 is substantially equal to the engine's manifold vacuum. Similarly, since the spring 76 maintains the valve means 70 closed, the pressure level in the section 52 will be substantially equal to atmospheric pressure due to communication through the orifice 68. Therefore, the section 28 of the pneumatic chamber 26 will also be at substantially atmospheric pressure, and consequently, a pressure differential acts across the piston 32 urging the latter to the left viewing the FIGURE, supplementing the force of the spring 34. Since a force must be exerted on the plunger 24 at least equal to the maximum braking pressure, the springs corresponding to the spring 34 in prior art devices had to be quite strong and therefore relatively large and expensive. However, since a pressure differential acts across the piston or diaphragm 32 urging the latter to the left viewing the FIGURE, the size of the spring 34 may be reduced. Therefore, the pressure differential across the piston or diaphragm 32 required to urge the latter to the right when an incipient skidding condition is sensed, is also reduced, since it need only overcome the smaller force exerted by the spring 34.

When the electronic control unit 92 senses an incipient skidding condition, an output signal is generated which actuates the solenoid 90 to raise the valve element 88 away from the passages 82, thereby communicating the section 48 with air and atmospheric pressure. Since the rate at which air is communicated to the section 48 through the passages 82 is much greater than the rate in which air is sucked from the section 48 through the passage 64 due to flow-restricting orifice 66, the section 48 is at substantially atmospheric pressure upon actuation of the solenoid valve. Therefore, the pressure level in section 30 of pneumatic chamber 26 is also increased from the vacuum level initially communicated thereunto prior to the generation of the control signal to substantially atmospheric pressure after generation of the control signal.

The atmospheric pressure in the section 48 acts on the diaphragm 78. Since the opposite side of the diaphragm 78 continues to be communicated to engine manifold vacuum, the diaphragm 78 is urged downwardly viewing the drawing. When the diaphragm 78 is moved a sufficient amount, the diaphragm 78 engages the valve member 72, urging the latter downward away from the valve seating area 74 to thereby communicate the section 52 with the section 50 and therefore with engine manifold vacuums. Since pressure is sucked from the section 52 at a rate greater than that at which atmospheric air is communicated into the section 52 through the orifice 68, the section 52 remains at substantially engine manifold vacuum, and therefore, the section 28 of pneumatic chamber 26 is also communicated to engine manifold vacuum. Since a higher fluid pressure level now exists within section 30 than in the section 28, a force is generated upon the piston or diaphragm 32 urging the latter to the right viewing the FIGURE against the bias of the spring 34. As the diaphragm or piston 32 moves to the right, fluid pressure acting upon the left-hand end of the plunger 24 also urges the latter to the right, thereby maintaining the right-hand end of the plunger 24 in engagement with the diaphragm or piston 32. When the plunger 24 has moved a sufficient amount, check valve means 20 closes thereby terminating communication between the vehicle master cylinder and the brakes of the vehicle, to prevent a further increase in the fluid pressure in the brakes. As the plunger 24 moves further to the right, the volume of the compartment defined between the left-hand end of the plunger and the check valve 20 is increased, thereby decreasing the pressure level therein. Since this compartment is communicated to the rear wheel brakes of the vehicle, a decrease in the fluid pressure level in this compartment will also reduce the fluid pressure level at the rear brakes of the vehicle, permitting the wheels to reaccelerate. When the wheels have accelerated to such an extent that the electronic control unit 92 no longer senses an incipient skidding condition, the control signal is terminated, thereby deenergizing the solenoid 90. When this occurs, the valve element 88 again closes the passages 82 to terminate communication between the section 48 and atmospheric air in cavity 40. At the same time air is sucked from the section 48 at a controlled rate through orifice 66. Similarly, upon deenergization of a solenoid 90, the spring 76 returns the valve element 72 into sealing engagement with the valve seating area 74, thereby terminating communication between the section 52 and engine manifold vacuum. Pressure in the section 52 increases at a controlled rate governed by the size of the orifice 68. Due to the size of the orifices 58 and 68, the fluid pressure level in section 28 of pneumatic chamber 26 increases at a predetermined rate upon deenergization of the solenoid 90, and due to the size of the orifices 54 and 66 the pressure level in the section 30 of pneumatic chamber 26 decreases at a predetermined rate upon deenergization of the solenoid 90. This reversing of the pressure level across the diaphragm or piston 32 again exerts a force on the latter urging it to the left viewing the FIGURE, supplementing the force of the spring 34. Movement of the diaphragm or piston 32 to the left also urges the plunger 24 to the left, to gradually decrease the volume of the aforementioned chamber defined between the left-hand end of the plunger 24 and the check valve means 20. As the size of this chamber is reduced, the fluid pressure level therein is increased, and since this pressure level is also communicated to the vehicle's brakes, the pressure level therein will also be increased at a controlled rate governed by the rate at which the diaphragm or piston 32 moves. Finally, the check valve means 20 will again be opened to permit substantially uninhibited fluid communication between the vehicle master cylinder and the brakes of the vehicle.

I claim:

1. In a valve:
   a housing defining a bore therewithin divided into a first section, a second section, and a third section;
   first restricting means permitting communication at a controlled rate between said first and second sections;
   second restricting means permitting communication at a controlled rate between said third section and a higher pressure source;
   passage means permitting unrestricted fluid communication between said second section and a lower pressure source;
   first and second outlet ports communicating with said first and third sections respectively, whereby said first outlet port is normally communicated to said lower pressure source through said first restricting means and said second section and said second outlet port is normally communicated to said higher pressure source through said thrid section and said second restricting means;
   valve means actuable to communicate said first section to said higher pressure source and said third section to said lower pressure source whereby, upon actuation of the valve means, the first outlet port is communicated to said higher pressure source and said second outlet port is communicated to said lower pressure source;
   said valve means including an electrically actuated first valve member controlling communication between said first section and said higher pressure source;
   said valve means further including movable means dividing said housing into said first and second sections, said movable means being responsive to the increase in the fluid pressure level in said first section to actuate in response thereto, and a second valve member normally preventing communication between said second and third sections, said second valve member being responsive to actuation of the movable means to open to thereby initiate communication between said second and third sections.

2. The invention of claim 1:
   said higher pressure source being air at atmospheric pressure, said lower pressure source being air at less than atmospheric pressure.

3. The invention of claim 1:
   said first restricting means including a passage communicating said first and second sections, and a flow-restricting orifice in said passage.

4. The invention of claim 3:
   said second restricting means including a flow-restricting orifice disposed between said third section and the atmosphere.

5. In a valve:
   a housing;
   movable means slidably mounted in said housing to define a first cavity therewithin between said movable means and the wall of said housing;
   a first outlet port on said housing communicated with said first cavity;
   an electrically actuated valve member actuable to communicate said first cavity to a higher fluid pressure source, said movable means moving in response to the pressure admitted into said first cavity by actuation of the electrically actuated valve member;
   a second outlet port on said housing normally communicated to said higher fluid pressure source; and
   another valve member responsive to moving of said movable means to communicate said second outlet port with a lower fluid pressure source;
   said housing being further divided into second and third cavities, said second cavity being communicated to said lower pressure source, said third cavity being communicated to said second outlet port, said another valve member controlling fluid communication between said second and third cavities and opening upon moving of the piston means to communicate said second cavity with said third cavity;
   a first flow-restricting orifice communicating said first cavity with said second cavity, and a second flow-restricting orifice communicating said third cavity with said higher pressure source.

* * * * *